United States Patent [19]
Chudzik

[11] Patent Number: 5,157,591
[45] Date of Patent: Oct. 20, 1992

[54] ATTACHABLE AUXILIARY VEHICLE LIGHTING SYSTEM

[76] Inventor: Michael J. Chudzik, 17921 72nd Ave. West, Edmonds, Wash. 98026

[21] Appl. No.: 761,164

[22] Filed: Sep. 11, 1991

[51] Int. Cl.$^5$ .............................................. B60Q 1/00
[52] U.S. Cl. ........................................ 362/80; 362/61; 362/72; 362/83.3
[58] Field of Search .................... 361/61, 80, 72, 80.1, 361/83.3

[56] References Cited

U.S. PATENT DOCUMENTS

| | | | |
|---|---|---|---|
| 2,975,401 | 3/1961 | Shupe | 340/84 |
| 3,176,903 | 4/1965 | Farley | 224/42.03 |
| 3,590,236 | 6/1971 | Ussery | 240/7.1 |
| 4,171,077 | 10/1979 | Richard, Jr. | 224/42.03 B |
| 4,204,191 | 5/1980 | Daniels | 362/72 |
| 4,541,555 | 9/1985 | Miree | 362/72 |
| 4,586,113 | 4/1986 | Tsuyama | 362/72 |
| 4,597,031 | 6/1986 | Tsuyama | 362/72 |
| 4,618,081 | 10/1986 | Miree | 362/72 |
| 4,697,725 | 10/1987 | Miree | 362/72 |
| 4,791,535 | 12/1988 | Sclafani et al. | 362/82 |
| 4,800,471 | 1/1989 | Lippert | 362/80 |
| 4,801,917 | 1/1989 | Winterfeld | 340/81 R |
| 4,858,082 | 8/1989 | Hayward | 362/61 |
| 4,955,577 | 9/1990 | Ching | 248/539 |

Primary Examiner—Ira S. Lazarus
Assistant Examiner—Sue Hagarman
Attorney, Agent, or Firm—Dean A. Craine

[57] ABSTRACT

An universal, selectively, attachable auxiliary vehicle lighting system is provided designed to be selectively attached to the front or rear of a vehicle, a trailer, a carrier attached to the vehicle, or to an object attached to the vehicle, trailer, or carrier, such as a ladder, a boat, or a bicycle, respectively. The lighting system includes a pair of separately attachable light assemblies each having a rigid mounting bracket and a light unit which may be electrically connected to the vehicle's lighting circuit. The mounting bracket has ear structures which extend laterally from each vertical side. In one embodiment each ear structure has a centrally located hole which engages with a wrapping member to attach each light assembly to different surfaces or objects. An optional bar extension is also provided which enables a pair of light assemblies to be structurally interconnected during use.

22 Claims, 13 Drawing Sheets

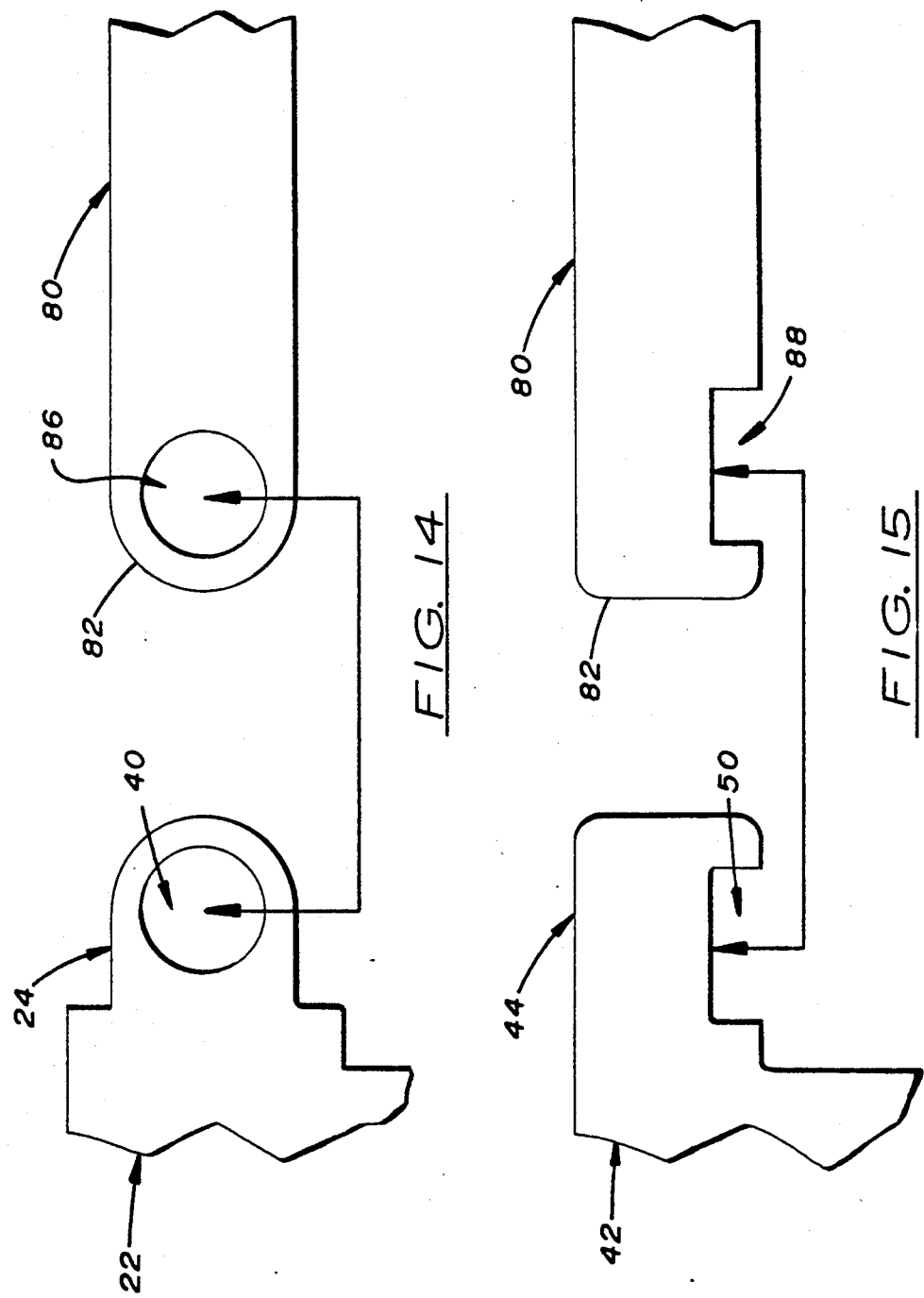

ATTACHABLE AUXILIARY VEHICLE LIGHTING SYSTEM

TECHNICAL FIELD

The present invention relates to auxiliary lights used on a vehicle or trailer. More particularly, the present invention relates to such lights which are selectively attachable either to a vehicle, trailer, a carrier attached to the vehicle or trailer, or to an object attached directed to the vehicle, trailer, or carrier.

BACKGROUND ART

It is sometimes desirable to attach auxiliary lights to a vehicle or trailer. For example, it is widely known that objects attached to the front or rear of a vehicle can partially obstruct the view of the vehicle's turn signals or taillights. When one or more bicycles are attached to such bicycle carriers, one's view of the vehicle's turn signals or taillights, respectively, can be partially or completely obstructed which, of course, can cause accidents. Auxiliary lights that can be easily connected to the vehicle's lighting system and which can be easily and universally mounted to different surfaces or objects in conspicuous locations, would be highly desirable.

It is common practice to transport long loads that extend beyond the end of the vehicle or trailer. Many states require that drivers attach a flag or some other indicator to the end of the load before transporting it. An auxiliary light system that connects to the vehicle's taillight electrical circuit which the user can selectively attach to the end of load would be highly desirable.

It some instances, it may also be desirable to use taillights that can be easily attached and detached from the vehicle or trailer during use. For example, with a boat trailer it is often necessary to back the trailer into a body of water when launching a boat. During the procedure, the trailer's electrical connections and taillights may be submerged in the water which can cause electrical shorts or corrosion. Taillights that can be easily attached and detached from the trailer would be highly desirable.

Heretofore, auxiliary lights for a vehicle or trailer are widely known. None, however, are universally attachable either to the front or rear of a vehicle, a trailer, or carrier attached to the vehicle or trailer, or to different objects attached directly to the vehicle, trailer, or carrier.

DISCLOSURE OF INVENTION

It is an object of the present invention to provide a selectively attachable auxiliary lighting system for vehicles or trailers.

It is another object of the present invention to provide an auxiliary lighting system that is attachable either to the front or rear of a vehicle or trailer, to a carrier attached to the vehicle or trailer, or to various objects carried directly by the vehicle, trailer, or carrier.

These and other objects are met by the present invention comprising an universal, attachable lighting system that may be selectively attached to a vehicle, a trailer, a carrier attached to a vehicle or trailer, or an object directly attached to the vehicle, trailer or carrier. The lighting system comprises a pair of separately attachable light assemblies which, during use, are electrically connected to the vehicle's primary lighting system. Each light assembly includes a light unit attached to a rigid mounting bracket. Each mounting bracket has two ears structures that extend laterally from each side. An attachment means is manufactured on each ear structure that engages one end of a wrapping member. During use, each mounting bracket is located in a desired position and each wrapping member is wrapped around various ornamental or structural objects located nearby on the vehicle, trailer, carrier, or object. Each wrapping member also includes a length adjustment means which enables the user to adjust the length of the wrapping member, and a locking means which enables the user to lock the wrapping member in the desired position. Various embodiments of the ear structures and attachment means, and the wrapping members having different length adjustment means, and locking means are disclosed herein.

In the preferred embodiment, each ear structure has a half-circular outer surface with an attachment means comprising a circular hole manufactured substantially centrally thereon. The wrapping member comprises a strap connector that is slidingly attached at one end to the circular hole which enables the user to slidingly rotate the strap connector approximately 180 degrees from the upward vertical position to the downward vertical position. Each strap connector has an inside and an outside hook and loop surface, respectively, which the user may selectively interconnect during use to adjust the length and to lock the strap connector in place. All of these features, in combination, enable the user to attach each light assembly to different vehicle and trailer surfaces, or carriers, or objects attached thereto.

In another embodiment of the invention, an optional extension bar is provided which is used to structurally connect a pair of light assemblies together during use.

BRIEF DESCRIPTION OF DRAWINGS

FIG. 14 is an illustration showing the first embodiment of the extension bar being attached to the first embodiment of the mounting bracket.

FIG. 15 is an illustration showing the second embodiment of the extension bar being attached to the second embodiment of the mounting bracket.

BEST MODE FOR CARRYING OUT THE INVENTION

Figure 1:
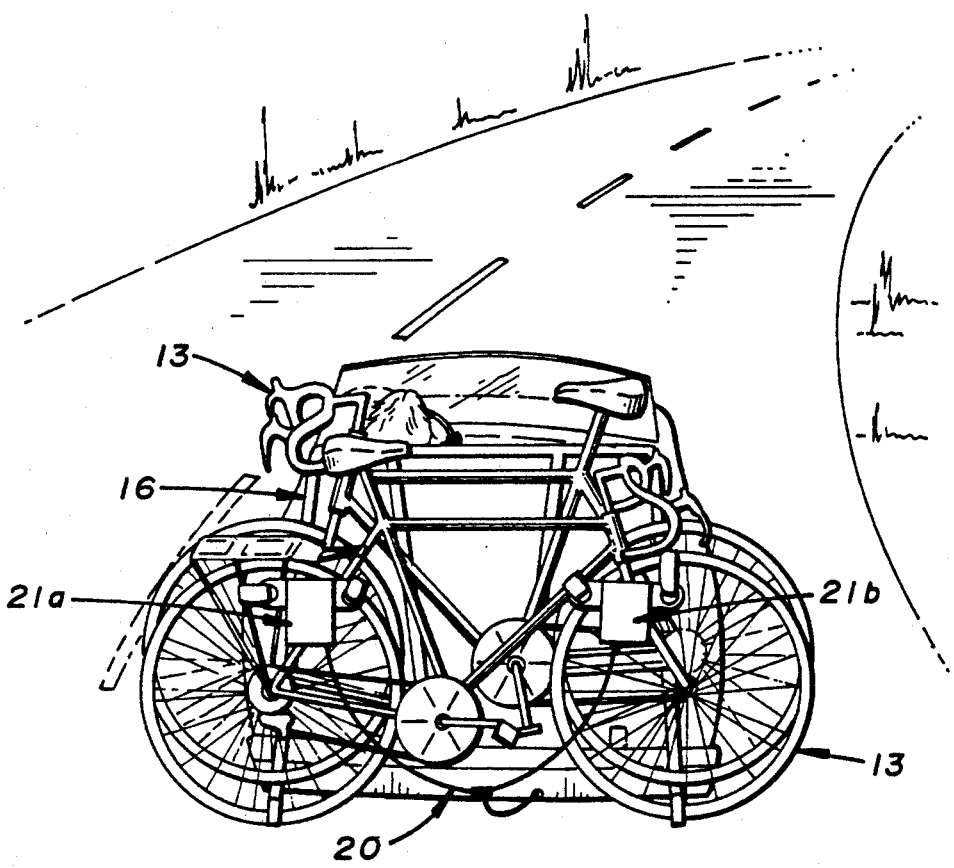
FIG. 1 is a perspective view of the lighting system with a vehicle with a rear-mounted bicycle carrier transporting two bicycles.
Figure 2:
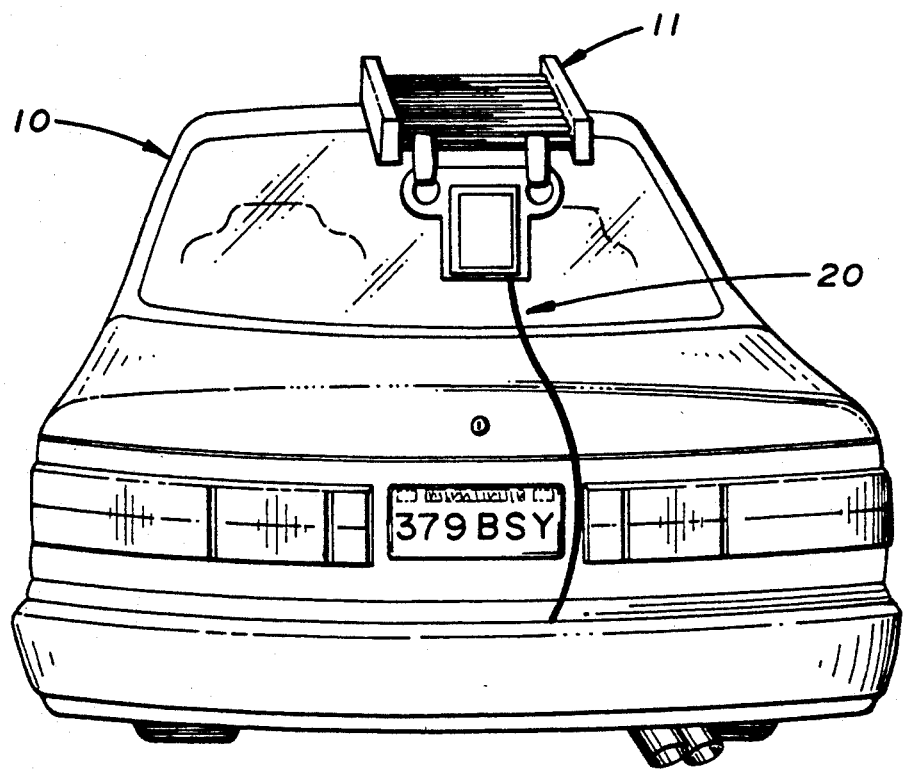
FIG. 2 is a perspective view of the present invention used with a vehicle carrying a ladder attached to the roof with one light assembly attached thereto.
Figure 3:
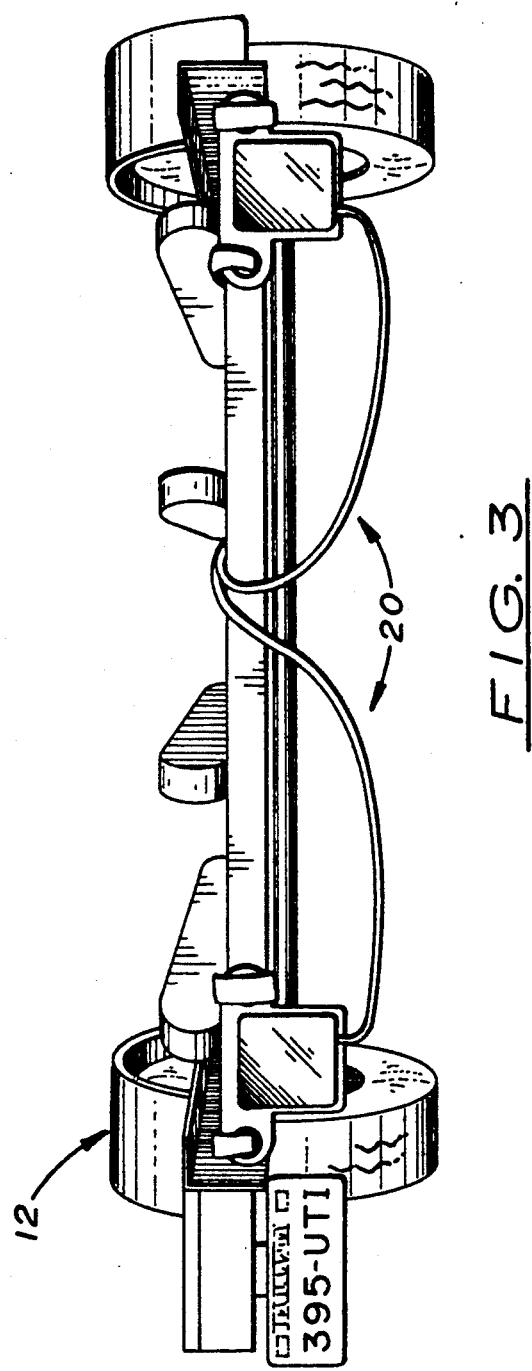
FIG. 3 is a perspective view of the present invention shown attached to the rear of a boat trailer.

Referring now to the drawings in greater detail, where like reference numbers denote like parts in various figures, there is shown in FIG. 1 an attachable lighting system 20 comprising two left and right light assemblies 21a and 21b, respectively, attached to a bicycle 13 transported by a rear-mounted bicycle carrier 16 Lighting system 20 is universally attachable to other surfaces or objects, such as a ladder 11 attached to the roof of a vehicle 10, as shown in FIG. 2, or the rear of a trailer 12, as shown in FIG. 3.

Figure 4:
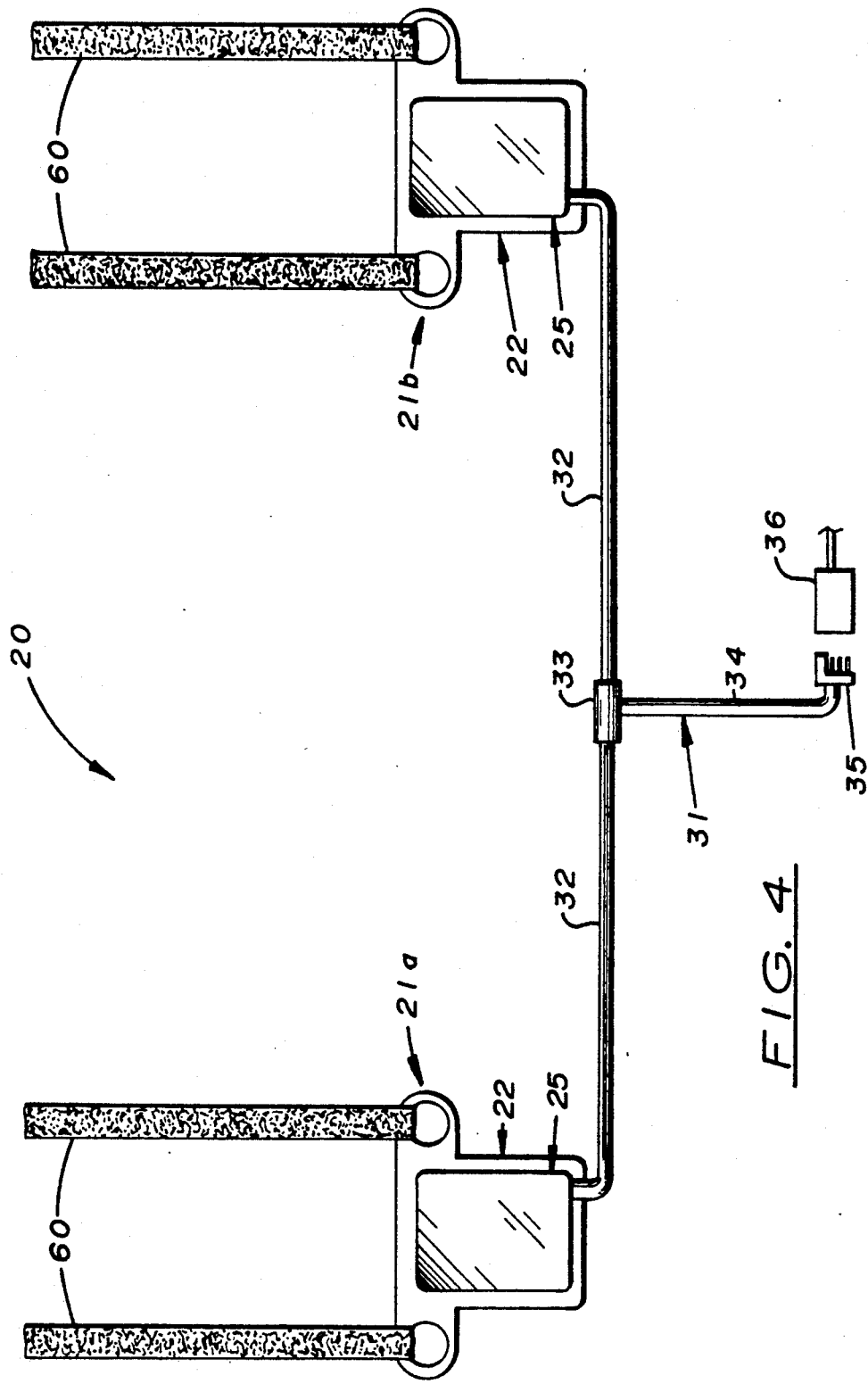
FIG. 4 is a plan view of the attachable lighting system.

As shown more clearly in FIG. 4, the lighting system 20 comprises two light assemblies 21a and 21b designed to be attached separately in selected positions to different various surfaces or objects. Each light assembly 21a and 21b comprises a rigid mounting bracket 22, a light unit 25 attached to the front surface thereof, two wrapping members comprising strap connectors 60 used to attach each mounting bracket 22 to the surface or object, and an electrical cord 31 that connects the two light units 25 to the vehicle's main electrical lighting circuit. In the embodiment shown, electrical cord 31 includes two branch electrical cords 32 one from each light assembly 21a and 21b that connect at one end to their respective light units 25. The opposite end of each cord 32 is attached to a "T" connector 33 which is attached to one end of a primary electrical cord 34 which has an electrical plug 35 that connects to a compatible trailer hitch electrical plug connector 36. During use, the plug connector 36 is electrically connected to the vehicle's main lighting circuit to provide stop light, turn signal, and/or brake light functions. Although for illustration purposes the lighting system 20 is described connected to the vehicle's taillight circuit, it should be understood that the lighting system 20 could be attached to the front surface of a vehicle and connected to the vehicle's front lighting circuit to provide turn signal function.

Figure 5:
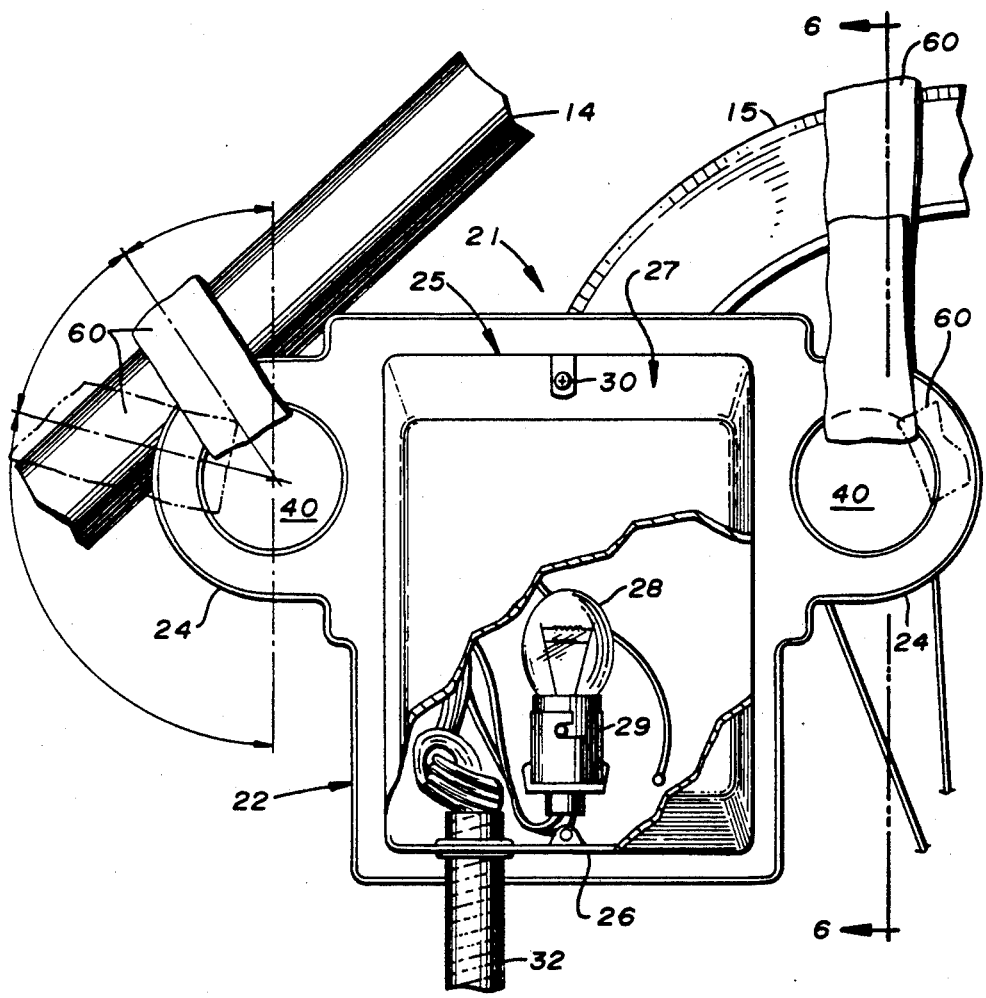
FIG. 5 is a plan view, partially broken away of a light assembly.

As seen in FIG. 5, each mounting bracket 22 is a planar structure having at least one ear structure 24. In the preferred embodiment, each mounting bracket 22 has two ear structures 24 that extend laterally from each vertical side surface near the upper horizontal top surface. Each ear structure 24 has an attachment means manufactured thereon which is capable of engaging a wrapping member, described further below. The attachment means and wrapping member enable the user to selectively attach one side of the mounting bracket 22 to a desired surface or object.

In the preferred embodiment, shown in FIGS. 1-8, each ear structure 24 has a half-circular outer surface with an attachment means comprising a centrally located circular hole 40. Circular hole 40 has a sufficient diameter measuring 1½ inches, which allows the wrapping member to be extended through during use. Circular hole 40 and the half-circular outer surface of ear structure 24 are concentrically located so that the distance between the inside surface of the circular hole 40 and the half-circular outer surface of ear structure 24 is substantially equal.

As shown in FIGS. 1-6, each wrapping member attached to each mounting bracket 22 comprises a strap connector 60. Each strap connector 60 has an adjustment means that enables the user to adjust its length, and a looking means which enables the user to securely lock the strap connector 60 in place during use. Each strap connector 60 is approximately 1 inch wide and 7 to 18 inches in length, and made of strong, flexible material resistant to different weather conditions, such as nylon. It should be understood, however, that the size, shape, and the material used for strap connectors 60 may be modified for special uses.

In the preferred embodiment, the adjustment means and locking means comprise continuous loop and hook layers formed on outside surface 63 and inside surface 64, respectively, of each strap connector 60. Using opposite, continuous loop and hook layers in this manner, enables the user to adjust the length of the strap connector 60 by wrapping the strap connector 60 around an object or ear structure 24 and then pressing the outside and inside surfaces 63 and 64, respectively, together at any position to lock the strap connector 60 in place.

As shown FIG. 5, during use a strap connector 60 is wrapped around an adjacent object 14 or 15 and extended through the circular hole 40 located on each ear structure 24. The strap connector 60 is wrapped around the adjacent objects 14 or 15 so that the outside surface 63 faces outwardly.

Figure 6:
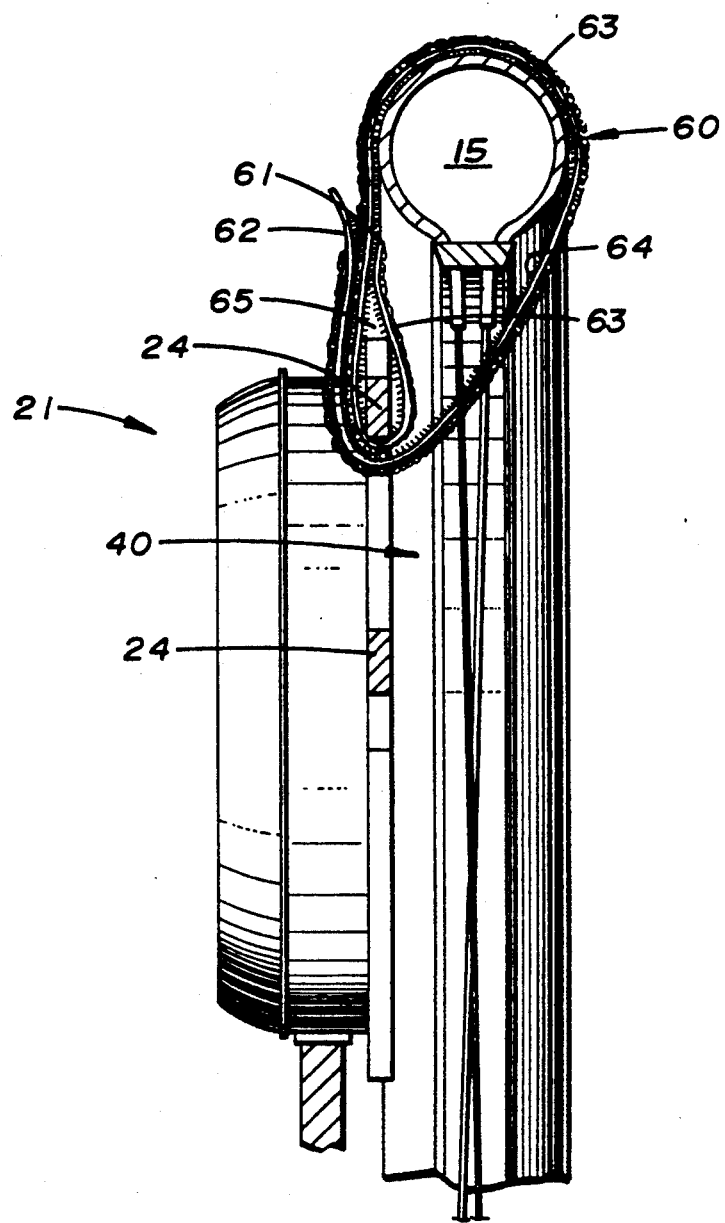
FIG. 6 is a section view of the light assembly taken along line 6—6 taken in FIG. 5.

As shown in both FIGS. 5 and 6, during manufacture of the light assembly 21, the first end 61 of the strap connector 60 is extended through hole 40 and wrapped around the outer portion of the ear structure 24. In the preferred embodiment, the first end 61 is sewn or adhesively attached to the inside surface of 64. For some uses, the first end 61 may be securely attached in another manner or may be removably attached to the inside surface 64. When the first end 61 and inside surface 64 are attached in this manner, a sliding space 65 is created near the first end 61 enabling the strap connector 60 to be slidingly rotated along the ear structure 24. The inside surface of each hole 40 is relatively smooth and the size of the sliding space 65 is sufficient so that the user may easily slide the strap connector 60 around the ear structure 24 in approximately 180 degrees from the upward vertical position to the downward vertical position as shown in FIG. 5. By moving the strap connector 60 in this manner, the user is able to selectively attached the strap connector 60 to different surfaces or objects located within the 180 degree path. After the strap connector 60 is aligned in the desired position on ear structure 24, the second end 62 of each strap connector 60 is then wrapped and pulled tightly around the object 15 and either extended back through hole 40 (shown) or around the lower surface of each ear structure 24. The strap connector 60 is continuously wrapped around the object 14 or 15 in this manner until the entire loop and hook surfaces, 63 and 64, respectively, are interconnected. By using full length hook and loop layers over outside and inside surfaces 63 and 64, respectively, the user can adjust the distance between the object 14 and the mounting bracket 22 by wrapping the strap connector 60 until the desired distance is obtained and then press the hook and loop layers together to lock the strap connector 60 in place.

Figure 7:
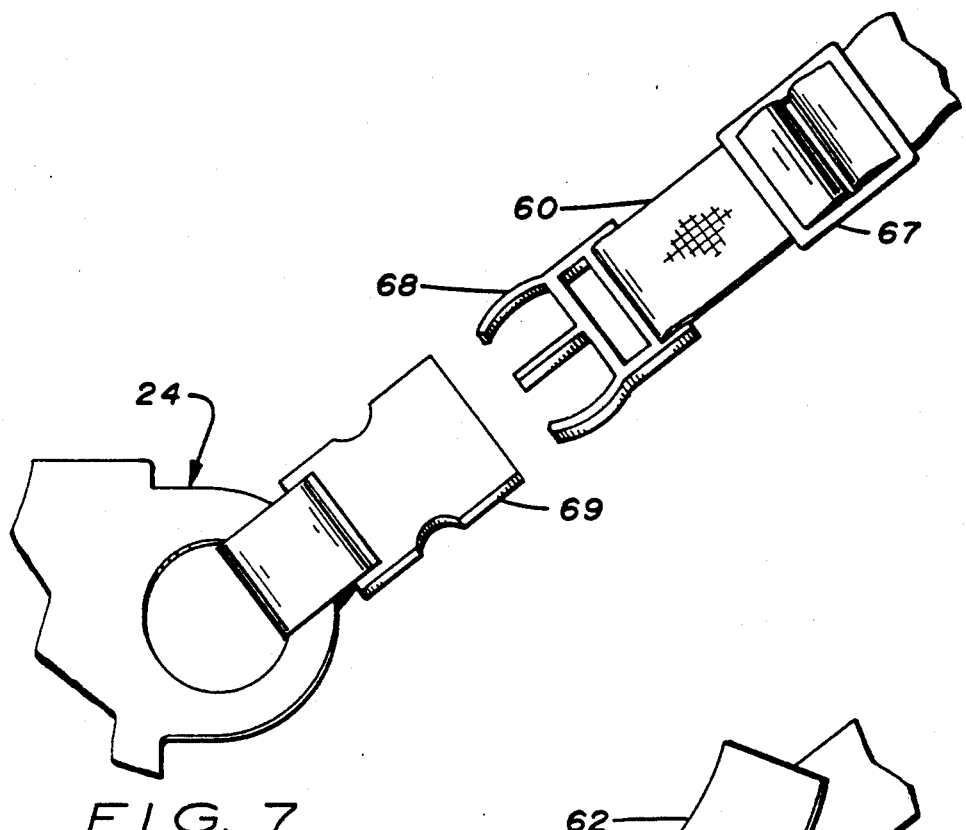
FIG. 7 is a partial plan view of a strap connector with a male and female coupler and cinching buckle attached thereto.

FIG. 7 shows strap connector 60 having an alternative length adjustment means and locking means. The alternative length adjustment means is a cinching buckle 67 which enables the user to adjust the length of strap connector 60. The locking means is a male and female locking coupler 68 and 69, respectively, disposed in strap connector 60 which can be selectively interconnected thereby enabling the user to selectively attach and lock the strap connector 60 in position during use.

Figure 8:
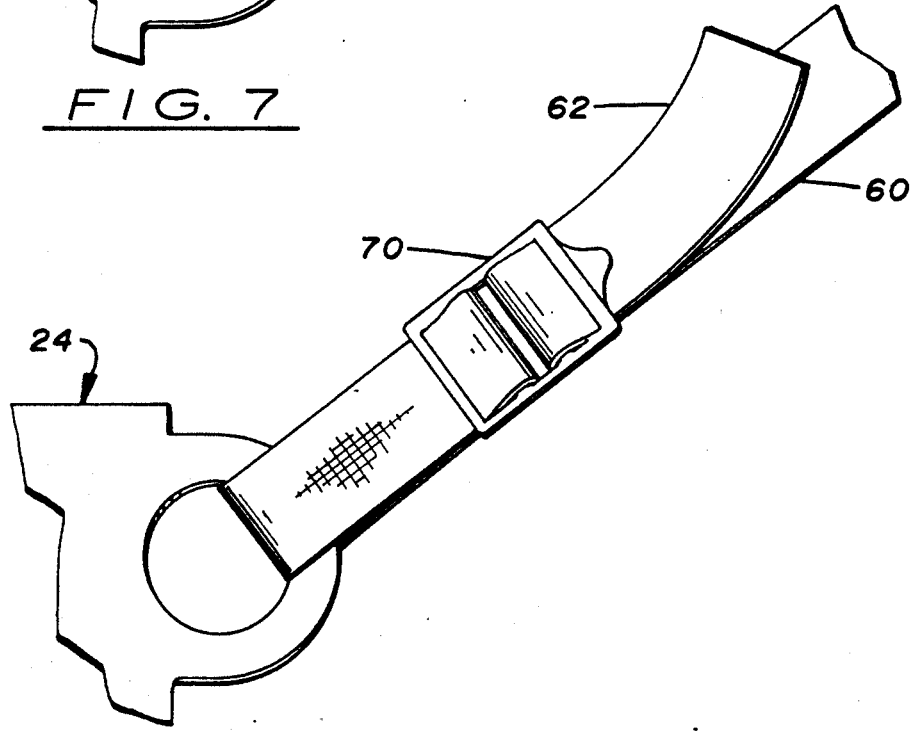
FIG. 8 is a partial plan view of a strap connector with a locking cinching buckle attached thereto.

FIG. 8 shows strap connector 60 having another alternative combined length adjustment means and locking means comprising a single locking cinching buckle 70. Locking cinching buckle 70 is near identical to cinching buckle 67 with the second end 62 of strap connector 60 being inserted therethrough to act as a pull so that the user can adjust the length and tighten the strap connector 60 during use.

As shown in FIG. 5, mounting bracket 22 has an optional front recessed surface 23 manufactured centrally thereon in which the light unit 25 may be seated and attached using a suitable adhesive or mechanical connector (not shown). The light unit 25 comprises a box structure 26, a lens cover 27 which attaches over the front of the box structure 26, a conventional vehicle taillight bulb 28, and a bulb socket 29 which is electrically connected to the short electrical cord 32. Mounting bracket 22 itself is approximately ¼ inches thick and is made of rigid plastic or metallic material. Box structure 26 is also made of durable plastic material or metallic material. Lens cover 27, made of red or amber plastic or glass, is attached to the box structure 26 by two threaded connectors 30 (one shown) near the upper and lower horizontal surfaces. One end of each short electrical cord 32 extends through the box structure 26 of the light unit 25 and connected to the bulb socket 29.

Figure 9:
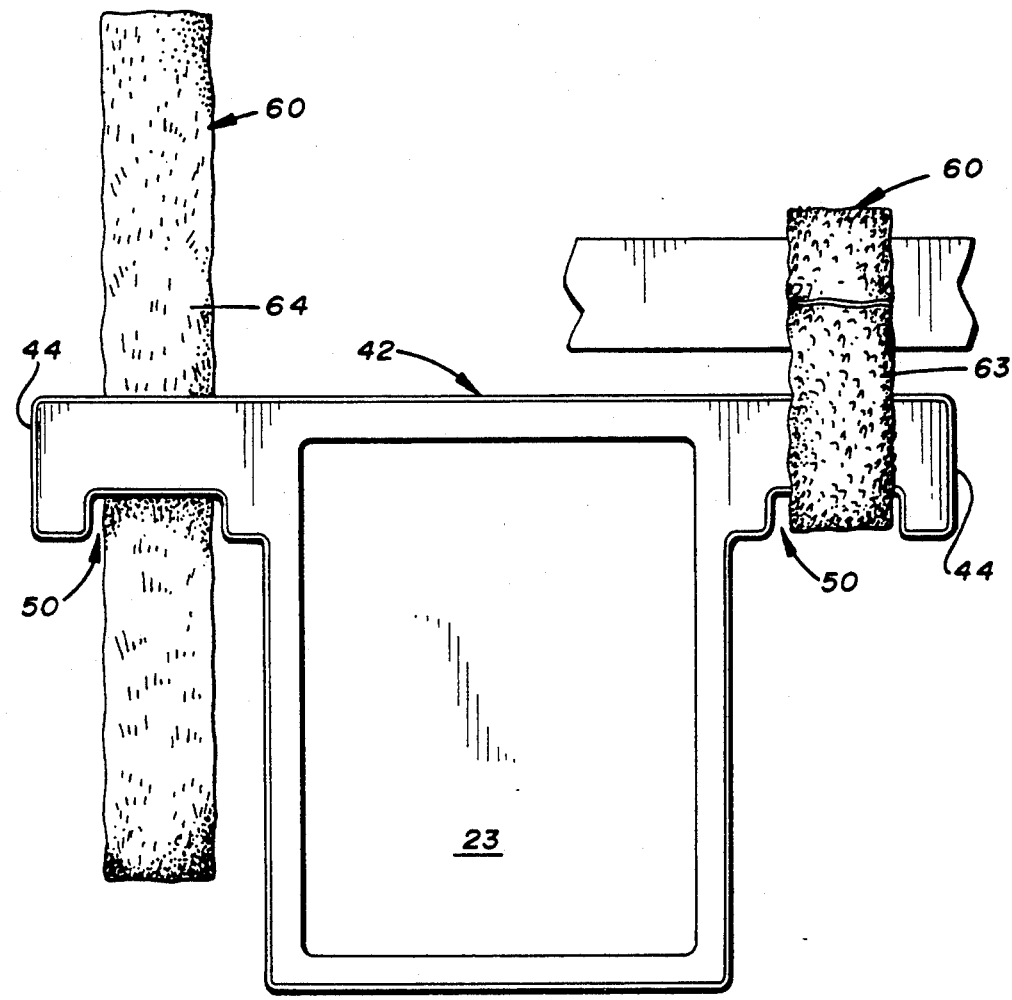
FIG. 9 is a plan view of a second embodiment of the mounting bracket with a horizontal cutout manufactured on the lower horizontal surface of a rectangular-shaped ear structure.
Figure 10:
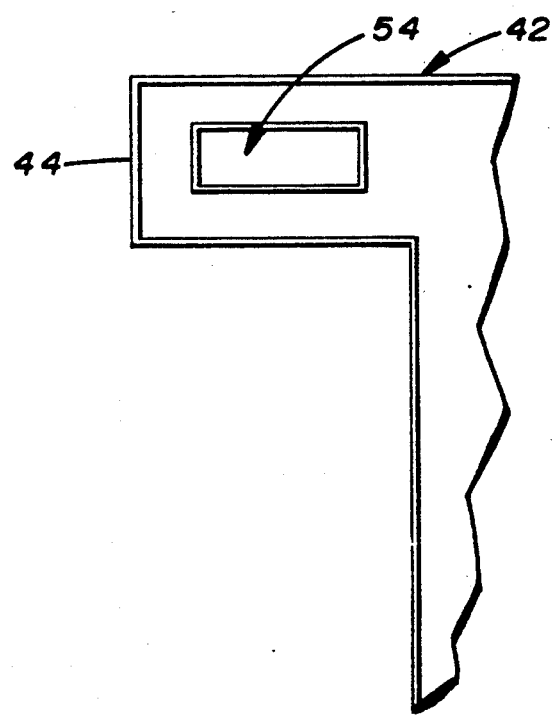
FIG. 10 is a partial plan view of an ear structure shown in FIG. 9 with the horizontal slot manufactured centrally thereon.

FIG. 9 shows an alternative mounting bracket 42 having a square or rectangular-shaped ear structure 44 extending laterally from each vertical side. Like mounting bracket 22, mounting bracket 42 has an attachment means attached to each ear structure 44 which connects to a wrapping member, such a strap connector 60. On mounting bracket 42, the attachment means may comprise a rectangular-shaped horizontal cutout 50 disposed along the lower horizontal surface. Each cutout 50 is manufactured sufficiently wide and deep so that the strap connector 60 may be retained therein during use. In another embodiment, shown in FIG. 10, mounting bracket 42 has a centrally disposed rectangular-shaped horizontal cutout 54 formed on each ear structure 44.

As stated above with mounting bracket 22, the first end 61 of the strap connector 60 may be attached to mounting bracket 42 in the same manner creating a sliding space 65. Alternatively, the first end 61 may be unattached to mounting bracket 22 and 42 as shown in FIG. 9. With mounting bracket 42, horizontal slots 50 and 54 limits the user's ability to align the strap connectors 60 to attach to adjacent objects.

Figure 11:
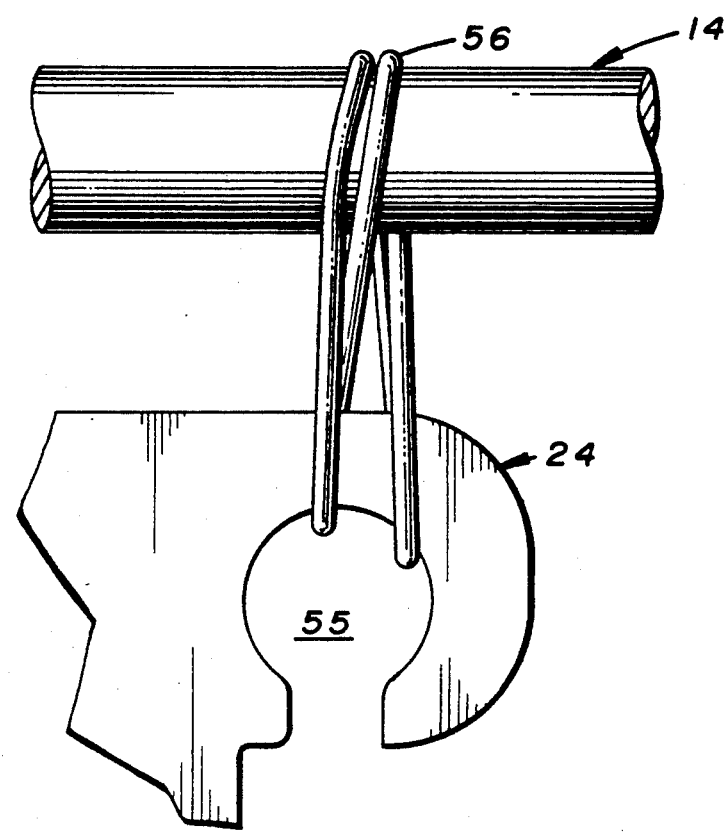
FIG. 11 is a partial plan view of an ear structure with a vertically disposed rounded slot with an elastic loop attached thereto.

FIG. 11, shows another embodiment of the attachment means manufactured on ear structure 24 or 44 (not shown) comprising a rounded slot 55 with its longitudinal axis being disposed vertically. Slot 55 enables the user to use either a strap connector 60, described above, or an elastic member comprising an elastic loop 56. During use, the elastic loop 56 is positioned over the ear structure 24. The elastic loop 56 is then stretched and wrapped once (shown) or several times around the object 14. The opposite end of the elastic loop 56 is extended downward over the ear structure 24 to attach and lock the elastic loop in place.

Figure 12:
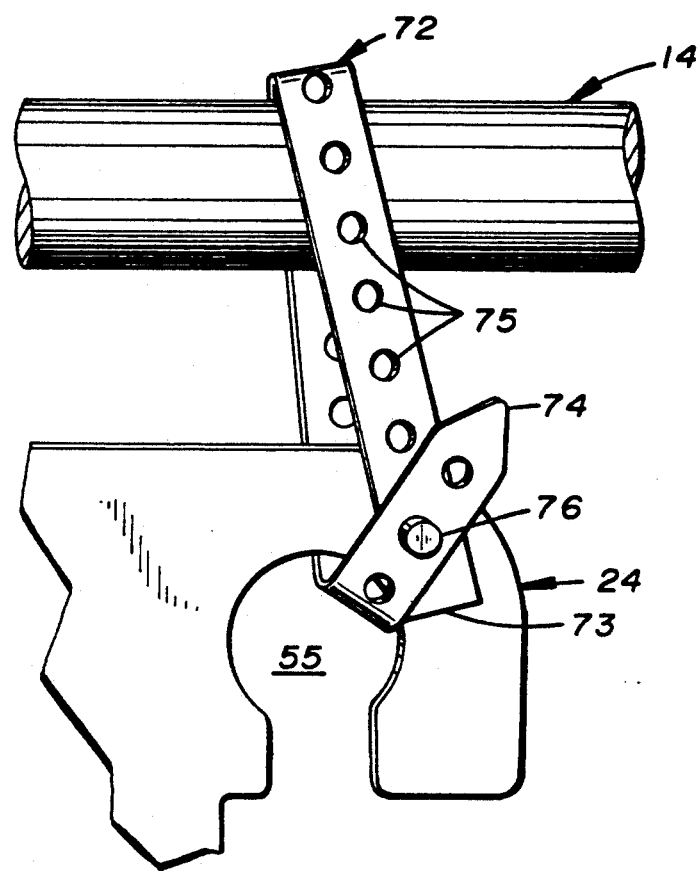
FIG. 12 is a partial plan view of an ear structure shown in FIG. 11 with an elastic ban attached thereto.

FIG. 12 shows an alternative elastic member comprising an elastic ban 72 used to attach the ear structure 24 to an object 14. Elastic ban 72, which is made of elastic material such as rubber or latex material or stretchable cloth material, includes a first end 73 and an opposite second end 74. Holes 75 are manufactured at equal spacing along longitudinal axis of elastic ban 72. During use, a pin 76 attached to the outside surface of the ear structure is inserted through a hole 75 located near the first end 73. The second end 74 is then wrapped around the object 14 until the desire length is obtained, and through rounded slot 55. Pin 76 is then inserted through a hole 75 located near the second end 74 to hold the elastic ban 72 in place.

Figure 13:
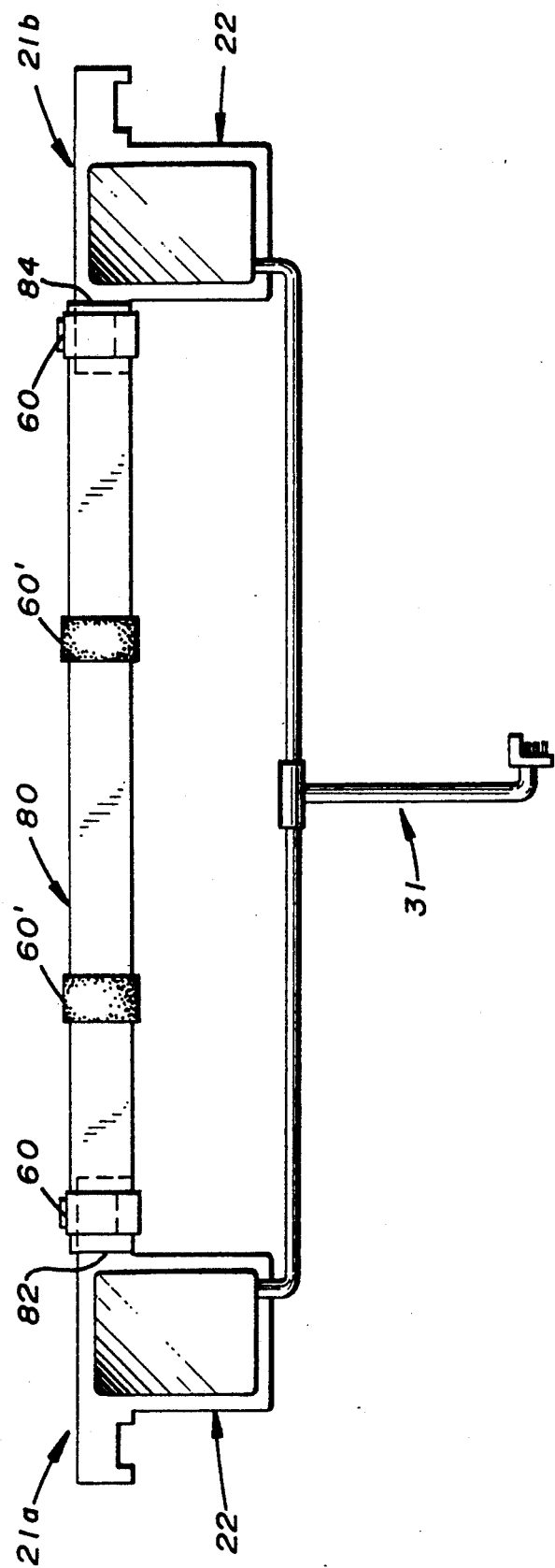
FIG. 13 is a plan view of the attachable lighting system with an optional extension bar.

FIGS. 13 and 14 shows an optional extension bar 80 used with the light system 20 described herein to interconnect and keep the light assemblies 21a and 21b a desired distance (3 feet shown) apart during use. Extension bar 80 is an elongated structure having a sufficient length so that the pair of light assemblies 21a and 21b are kept a desired distance apart as required by many state transportation authorities. Extension bar 80 has two opposite ends, 82 and 84, respectively each having an attachment means manufactured thereon which is complimentary to the attachment means located on the adjoining mounting brackets 22. During used, a strap connector 60 is used to interconnect the attachment means located on each end 82 and 84 with the attachment means located on inside ear structures 24 of each mounting bracket 22. In some instances, additional strap connectors 60' may be used to attach the central portion of the extension bar 80 to an object.

As discussed above, the extension bar 80 must have a complimentary attachments means which enables each end 82 and 84 to be attached to the inside ear structure 24. When used with mounting bracket 22, the complimentary attachment means comprises a circular hole 86 which is approximately the same size as hole 40 located on ear structure 24. As shown in FIG. 15, when used with mounting bracket 42, the complimentary attachment means a rectangular-shaped cutout 88 manufactured approximately the same size as cutout 50.

To attach the light system 20 to the surface of a vehicle, trailer, or carrier, or to an object attached thereto, one or both light assemblies 21a and 21b are first securely attached. A wrapping site on the surface or object is located for each wrapping member used with each mounting bracket. When two light assemblies 21a and 21b are used, the wrapping sites must be located so that the light assemblies 21a and 21b, as shown in FIG. 1, are approximately three feet apart and approximately two to four feet above the ground. Once the wrapping sites are located, the light assemblies 21a and 21b are then positioned and attached thereto using one of the wrapping members. The wrapping members are wrapped around the object until the desired length is achieved and then locked to securely attach each side of the mounting bracket 22 to the surface or object. After the light assemblies 21a and 21b are securely attached, the electrical plug 35 is attached to the trailer hitch electrical plug connector 36 to connect the light system 20 to the vehicle's lighting circuit.

To remove the light system, the above steps are taken in reversed order.

When using the extension bar 80, the extension bar 80 is first attached to each light assembly 21a and 21b by aligning and connecting the complimentary attachment means located on the extension bar 80 with the two inside ear structures 24 located on the two mounting brackets 22. A wrapping member, such strap connectors 60, is used to interconnect the attachment means on each end of the extension bar 80 with each ear structure 24. When used on some surfaces or objects, one strap connector 60 may be sufficient to interconnect the adjoining attachment means and to attach the extension bar 80 to the surface or object. After the extension bar 80 and mounting brackets 22 have been connected, the light assemblies 21a and 21b are placed in the desired position and attached by interconnecting the wrapping members and the attachment means located on the two outside ear structures 24. A third or fourth wrapping members, such as strap connector 60', may be wrapped around the extension bar 80 to more securely attach the lighting system 20 to the surface or object.

In compliance With the statute, the invention has been described in language more or less specific as to the elements or steps required to practice the invention. It is understood, however, that the invention is not limited to the elements or steps described herein, since they describe the preferred manner of putting the invention into practice. The invention is therefore, claimed in any of its forms or modifications within the legitimate and valid scope of the appended claims properly interpreted in accordance with the doctrine of equivalents.

INDUSTRIAL APPLICABILITY

The invention disclosed herein will have wide use in trailer or vehicle lighting industries. This invention also will have wide use in the vehicle rack or carrier industries designed to transport various objects, such as bicycles, sail boards, ski equipment on a vehicle.

I claim:
1. An attachable vehicle lighting system, comprising:
   a. a pair of light assemblies, each said light assemblies comprising a rigid, planar mounting bracket having a front surface, and a light unit attached to said front surface, each said light unit capable of being electrically connected to the lighting circuit of said vehicle;
   b. each said mounting bracket having at least one ear structure extending laterally and parallel to said front surface;
   c. an attachment means manufactured on each said ear structure;
   d. a wrapping member capable of engaging said attachment means on each said ear structure and selectively attaching said mounting bracket either to said vehicle, a trailer or a carrier attached to said vehicle, or to an object attached to said vehicle, trailer or carrier.

2. A lighting system, as recited in claim 1, wherein each said ear structure has a half-circular outer surface.

3. A lighting system, as recited in claim 1, wherein said attachment means comprises a centrally located hole formed on each said ear structure.

4. A lighting system, as recited in claim 1, wherein said wrapping member is a strap connector slidingly attached to each said attachment means, each said strap connector having an inside surface and an outside surface.

5. A lighting system, as recited in claim 3, further including a hook layer formed on said inside surface and a loop layer formed on said outside surface on said strap connector, said hook surface and said loop surface capable interconnecting to attach and lock said strap connector in a desired position around said object during use.

6. A lighting system, as recited in claim 5, further including a cinching buckle and a male and female coupler attached to said strap connector, said cinching buckle being capable of adjusting the length of said strap connector and said male and female couplers capable of being interconnected to attach and lock said strap connector in a desired position around said object during use.

7. A lighting system, as recited in claim 6, further including a locking cinching buckle attached to said strap connector.

8. A lighting system, as recited in claim 2, wherein said attachment means is a rounded slot having a longitudinal axis disposed vertically on each said ear structure.

9. A lighting system, as recited in claim 8 wherein said wrapping member is an elastic loop.

10. A lighting system, as recited in claim 9, wherein said wrapping member is an elastic ban.

11. A lighting system, as recited in claim 1, wherein each said ear structure is a square or rectangular shape.

12. A lighting system, as recited in claim 10, wherein said attachment means is a horizontal cutout formed on the lower horizontal surface of each said ear structure.

13. A lighting system, as recited in claim 11, wherein said attachment means is a centrally disposed horizontal cutout formed on each said ear structure.

14. An attachable vehicle lighting system, comprising:
   a. a pair of light assemblies, each said light assemblies having a rigid mounting bracket and a light unit attached thereto, each said light unit capable of being electrically connected to the lighting circuit of said vehicle;
   b. each said mounting bracket having at least one ear structure that extends laterally therefrom;
   c. an attachment means manufactured on each said ear structure;
   d. a wrapping member capable of engaging said attachment means on each said ear structure and capable of selectively attaching either to said vehicle, a trailer or a carrier attached to said vehicle, or to an object attached to said vehicle, trailer or carrier, and;
   e. an extension bar capable of being interconnected at opposite ends to a pair of said light assemblies.

15. A lighting system, as recited in claim 14, further including said extension bar having a complimentary attachment means formed on each said opposite end which are complimentary to said attachment means located on each said light assembly.

16. A lighting system, as recited in claim 15, wherein said extension bar has a sufficient length so that said pair of light assemblies are spaced approximately 36 inches apart.

17. A lighting system, as recited in claim 16, wherein each said complimentary attachment means located on each said end of said extension bar is interconnected to said attachment means located on each said light assembly using one said wrapping member.

18. An attachable vehicle lighting system, comprising:
   a. a pair of light assemblies, each said light assembly comprising a rigid, planar mounting bracket having a front surface with two ear structures extending laterally therefrom, each said ear structure having an attachment means and a half-circular outer surface;

b. a light unit attached to each said mounting bracket capable of being electrically connected to the lighting circuit of a vehicle, and;

c. a wrapping member capable of being sliding engaged with each said attachment means located on each said ear structure, each said wrapping means also capable of being wrapping around various objects located either on said vehicle, a trailer attached to said vehicle, a carrier attached to said vehicle or trailer, or to an object attached to said vehicle, trailer or carrier.

19. A lighting system, as recited in claim 18, wherein said attachment means is a centrally located hole formed on each said ear structure.

20. A lighting system, as recited in claim 19, wherein said wrapping member is a strap connector having an inside surface and an outside surface, said inside surface having a hook layer and said outside surface having a loop layer formed thereon, said hook and loop surfaces being capable of interconnecting to selectively attach and lock said strap connector around said object.

21. A lighting system, as recited in claim 19, wherein said attachment means is a rounded slot having a longitudinal axis disposed vertically on said ear structure.

22. A lighting system, as recited in claim 21, wherein said wrapping member is an elastic member.

* * * * *